United States Patent
Jin et al.

(10) Patent No.: US 8,186,686 B2
(45) Date of Patent: May 29, 2012

(54) ELECTRICALLY-CONDUCTIVE SEAL ASSEMBLY

(75) Inventors: Xiaoling Jin, Farmington Hills, MI (US); William T. Ivan, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 477 days.

(21) Appl. No.: 12/432,419

(22) Filed: Apr. 29, 2009

(65) Prior Publication Data

US 2010/0276894 A1    Nov. 4, 2010

(51) Int. Cl.
*F16J 15/34* (2006.01)
*F16J 15/32* (2006.01)

(52) U.S. Cl. ........................... 277/353; 277/551

(58) Field of Classification Search .............. 277/919, 277/920, 550, 551, 355, 353
See application file for complete search history.

(56) References Cited

U.S. PATENT DOCUMENTS

| | | | | |
|---|---|---|---|---|
| 3,783,173 A | * | 1/1974 | Twomey | 174/356 |
| 3,799,559 A | * | 3/1974 | Kayser | 277/374 |
| 3,801,111 A | * | 4/1974 | Messenger | 277/565 |
| 4,195,854 A | * | 4/1980 | Bertin | 277/549 |
| 4,399,337 A | * | 8/1983 | Annis | 200/16 B |
| 5,251,081 A | * | 10/1993 | Cossette et al. | 360/97.02 |
| 6,608,410 B2 | * | 8/2003 | Sato et al. | 310/67 R |
| 7,136,271 B2 | * | 11/2006 | Oh et al. | 361/221 |
| 7,193,836 B2 | * | 3/2007 | Oh et al. | 361/220 |
| 7,498,703 B2 | * | 3/2009 | Rea et al. | 310/71 |
| 7,521,827 B2 | * | 4/2009 | Orlowski et al. | 310/68 R |
| 7,528,513 B2 | * | 5/2009 | Oh | 310/88 |
| 7,708,284 B2 | * | 5/2010 | Mormile et al. | 277/371 |
| 8,010,060 B2 | * | 8/2011 | Ivan et al. | 455/99 |
| 2003/0086630 A1 | * | 5/2003 | Bramel et al. | 384/476 |

* cited by examiner

*Primary Examiner* — Thomas Beach
*Assistant Examiner* — Nicholas L Foster
(74) *Attorney, Agent, or Firm* — Ingrassia Fisher & Lorenz, P.C.

(57) ABSTRACT

A seal for a vehicle having a transmission output shaft and a transmission output shaft housing is provided. The seal comprises a contact member at least partially surrounding and contacting the transmission output shaft, a support member coupled to the contact member, the support member at least partially surrounding the transmission output shaft and extending along the transmission output shaft, the support member coupled to the transmission output shaft housing, and an electrically-conductive surface overlying at least a portion of the contact member and at least a portion of the support member, the electrically-conductive surface contacting the transmission output shaft and the transmission output shaft housing.

19 Claims, 2 Drawing Sheets

ELECTRICALLY-CONDUCTIVE SEAL ASSEMBLY

TECHNICAL FIELD

Embodiments of the subject matter described herein relate generally to transmission output shaft seals. More particularly, embodiments of the subject matter relate to transmission output shafts seals having conductive surfaces.

BACKGROUND

Hybrid and electric vehicles typically include permanent magnet (PM) motors. Such motors can be used to propel the vehicle at a controlled rate of speed. A vehicle with a PM motor also includes a power inverter which produces an alternating current (AC) electrical system for use in the motor. Inherent in the production of AC electrical power is radiofrequency (RF) energy which is established between stator and motor components of the PM motor.

Just as the PM motor couples with devices in the transmission of the vehicle to transfer mechanical power throughout the vehicle, the RF energy can travel through the transmission throughout the vehicle. The distributed RF energy can produce interference in devices that rely on RF energy to communicate. For example, the RF energy can produce undesirable interference with an AM radio when the radio selects frequencies for reception near the frequency of the RF energy.

BRIEF SUMMARY

A seal for a vehicle having a transmission output shaft and a transmission output shaft housing is provided. The seal comprises a contact member at least partially surrounding and contacting the transmission output shaft, a support member coupled to the contact member, the support member at least partially surrounding the transmission output shaft and extending along the transmission output shaft, the support member coupled to the transmission output shaft housing, and an electrically-conductive surface overlying at least a portion of the contact member and at least a portion of the support member, the electrically-conductive surface contacting the transmission output shaft and the transmission output shaft housing.

A seal for a vehicle having an electrically-conductive transmission output shaft and an electrically-conductive transmission output shaft housing is also provided. The seal comprises a sealing member adapted to establish contact with and at least partially surround the transmission output shaft, the sealing member adapted to inhibit entry of contaminants into the transmission output shaft housing, and a first electrically-conductive surface overlying the sealing member, the first electrically-conductive surface adapted to contact the transmission output shaft and the transmission output shaft housing.

A vehicle sealing assembly is also provided. The vehicle sealing assembly comprises a transmission output shaft extending along a longitudinal axis, a transmission output shaft housing surrounding the transmission output shaft, a sealing member physically coupled to the transmission output shaft housing and surrounding the transmission output shaft, the sealing member electrically coupling the transmission output shaft to the transmission output shaft housing, a support member physically coupled to the transmission output shaft housing and extending in the direction of the longitudinal axis, the support member electrically coupled to the transmission output shaft housing, and a contact member physically and electrically coupled to the support member, the contact member electrically coupled to the transmission output shaft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
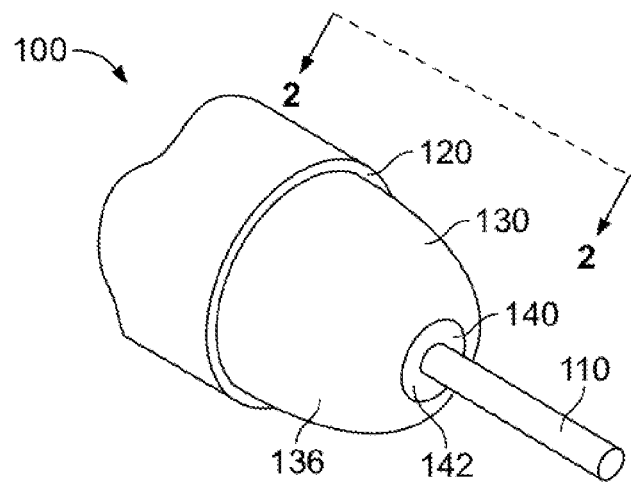
FIG. 1 is a perspective view of an embodiment of an electrically-conductive sealing assembly.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Such terminology may include the words specifically mentioned above, derivatives thereof, and words of similar import. Similarly, the terms "first", "second", and other such numerical terms referring to structures do not imply a sequence or order unless clearly indicated by the context.

A conductive seal assembly can form a conductive path between the transmission output shaft of a vehicle and a ground location. Such a conductive seal assembly can include a conductive surface on seal components surrounding the transmission output shaft of a vehicle having a permanent magnet motor. The conductive surface can be on one or more components of a seal which inhibits transmission fluid from leaking out and/or inhibiting contaminants from entering the transmission. The conductive seal assembly can couple the RF energy from the transmission output shaft to a metal transmission shaft housing. In this way, the RF energy can be channeled so as to avoid its propagation down the transmission output shaft and subsequent spread throughout the vehicle.

FIG. 1 illustrates an embodiment of a conductive seal assembly 100 for a transmission output shaft 110. The transmission output shaft 110 is surrounded by a transmission output shaft housing 120, also referred to as the housing 120. The seal assembly 100 comprises a support member 130, a contact member 140, and a sealing member 150 (shown in FIG. 2). Each component of the seal assembly 100 comprises an electrically-conductive surface 132, 142, 152. Preferably, the electrically-conductive surfaces 132, 142, 152 establish a continuous electrically-conductive path between the transmission output shaft 110 and the transmission output shaft housing 120.

The transmission output shaft 110 can be any rotating member used to transmit power from the motor of a vehicle to travel devices of the vehicle. The transmission output shaft 110 can extend along a longitudinal axis, and have radial and axial directions useful for reference, but not intended to limit the transmission output shaft 110 to any singular embodiment. Thus, while the following description is written in the context of a hybrid gas/electric or electric automobile, embodiments can be used in other vehicles as well, including other types of ground vehicles, such as motorcycles, bicycles, scooters, mopeds, heavy lifting vehicles, construction equipment, as well as vehicles in other traveling media, such as aircraft, watercraft, and spacecraft. Accordingly, the conductive seal assembly 100 can be used in a wide variety of vehicle types, and "vehicle" as used herein should not be constrained to any one specific vehicle.

Typically, the transmission output shaft 110 rotates in a lubricated environment. Accordingly, it is desirable to enclose the transmission output shaft 110 to retain the lubrication. This can be one function of the transmission output shaft housing 120. Preferably, the transmission output shaft 110 is at least partially surrounded by the transmission output shaft housing 120. The housing 120 functions to retain lubrication in close proximity to the transmission output shaft 110. Additionally, the housing 120 can inhibit introduction or entry of contaminants into the enclosed space between the housing 120 and the transmission output shaft 110. The housing 120 is typically composed of an electrically-conductive metal, such as a steel, iron, or aluminum, or alloys thereof. The housing 120 is preferably electrically grounded, or electrically coupled to an electrical ground.

Figure 2:
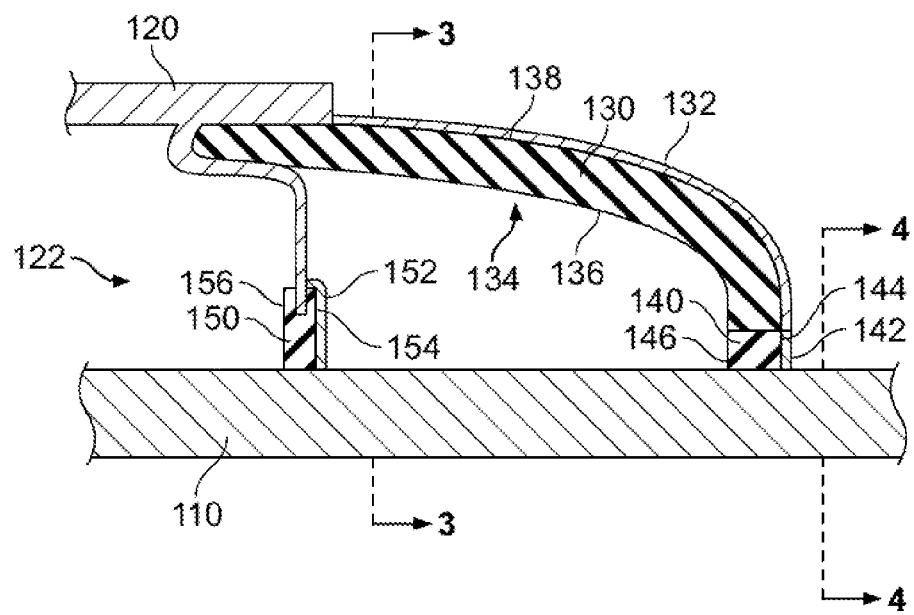
FIG. 2 is a cross-sectional view of the embodiment of FIG. 1.

With additional reference to FIG. 2, the housing 120 encloses a cavity 122 near the transmission output shaft 110 where lubrication can be contained. Because the transmission output shaft 110 is rotating during operation, a sealing member 150 is typically disposed against, and in contact with it, to seal the cavity 122. The sealing member 150 can have any appropriate shape, including an annular ring. Other configurations can be used, as appropriate for the embodiment. Although a circular member with a rectangular cross-section is shown for descriptive purposes, the sealing member 150 is not confined to such a shape.

Preferably, the sealing member 150 maintains contact with the transmission output shaft 110 while the shaft transmission output 110 rotates. The sealing member 150 is preferably composed of a material which is impermeable to most contaminants and the lubricant, thus sealing the cavity 122 from the outside environment. The sealing member 150 can be composed of a variety of materials, including a mineral-filled fluoroelastomer, or other elastomeric material. Non-elastomeric materials can also be used. The seal assembly 100, including the sealing member 150, can be coupled to the transmission output shaft 110 and transmission housing 120 through any appropriate technique, such as through the use of fasteners, including bolts and the like, adhesives and/or bonding agents, interference fitting techniques, and so on.

Preferably, the sealing member 150 is held in position contacting (thereby sealing) the transmission output shaft 110. Typically, the materials desirable for use in sealing the cavity 122 are poor electrical conductors. Accordingly, to electrically-couple the transmission output shaft 110 to the housing 120, the sealing member 150 can comprise an electrically-conductive surface 152.

The electrically-conductive surface 152 preferably contacts both the transmission output shaft 110 and the housing 120. The surface 152 can extend along an outer surface of the sealing member 150, as shown. Preferably, the surface 152 is disposed on the outside of the cavity 122. The electrically-conductive surface 152 can be embodied in a variety of ways while still electrically-coupling the transmission output shaft 110 and the housing 120. For example, in certain embodiments, the electrically-conductive surface 152 can be a coating layer of an electrically-conductive material disposed on the sealing member 150. In certain other embodiments, the surface 152 can be an insert of electrically-conductive material in the sealing member 150. In one such insert embodiment, the surface 152 can be a wedge portion of an annular-shaped sealing member. Variations of the embodiment can be produced where the wedge portion extends only near the outer surface of the sealing member 150, whereas in other embodiments, the surface 152 can extend entirely through the sealing member 150. In certain embodiments, an adhesion layer can be formed between the sealing member 150 and the electrically-conductive surface 152 to couple them together. Thus, in at least some embodiments, the electrically-conductive surface 152 is formed overlying at least a portion of the sealing member 150. The electrically-conductive surface 152 is preferably on the outer surface 154 of the sealing member 150, though it can be on an inner surface 156 in certain embodiments.

Figure 3:
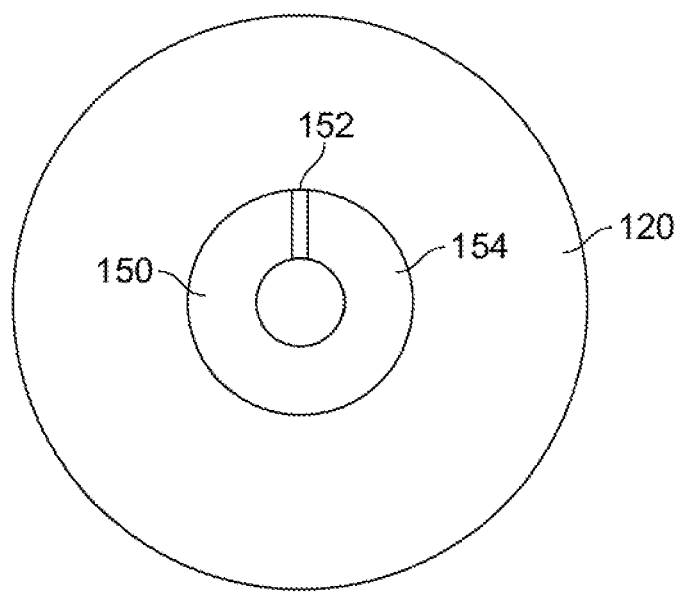
FIG. 3 is a detailed cross-sectional view of a portion of the embodiment as illustrated in FIG. 2.

In certain embodiments, the electrically-conductive surface 152 can be confined to a relatively narrow strip which extends along the sealing member 150 from the transmission output shaft 110 to the housing 120. One such narrow embodiment is shown in FIG. 3. The exact width of such a strip can vary between embodiments. In other embodiments, the surface 152 can extend entirely or substantially entirely around the sealing member 150, contacting the transmission output shaft 110 completely around its perimeter. Other permutations can also be embodied, such as partial surrounding of the transmission output shaft 110, or a plurality of stripes or channels spaced circumferentially around the sealing member 150.

The electrically-conductive surface 152 is preferably composed of a material having high electrical conductivity, such as copper, silver, zinc, or alloys thereof, though other metals can also be used. The surface 152 can be coating, such as a metal powder formed on the surface of the sealing member 150. Such a coating can include the use of a nano-powder. In other embodiments, the surface 152 can be formed as a solid member, such as the insert extending at least partially through the sealing member 150. Thus, type of material, as well as the technique for forming it on or in the sealing member 150, can vary between embodiments.

Additionally, because the sealing member 150 is contacting the transmission output shaft 110, which rotates during normal operation, some erosion of the sealing member 150 is typical. To maintain contact between the electrically-conductive surface 152 and the transmission output shaft 110, the surface 152 is preferably present along a direction extending radially outward from the transmission output shaft 110. Accordingly, as the sealing member 150 erodes at the contact point, the erosion continually exposes a face of the electrically-conductive surface 152. Therefore, in preferred embodiments, the electrically-conductive surface 152 comprises an ablative material, such as the powder coatings previously described. Thus, erosion of a face of the electrically-conductive surface 152 preferably does not cause splintering, cracking, or other undesirable effects, which may interrupt the electrical conduction between the sealing member 150 and the housing 120.

In addition to the sealing member 150, the transmission output shaft 110 can be at least partially surrounded by a support member 130. To further reduce the likelihood of contaminants entering the cavity 122 through the sealing member 150, certain embodiments can have a support member 130 extending along the transmission output shaft 110. The support member 130 can act as a cover or contaminant shield similar to the housing 120. Additionally, the support member 130 can couple to a contact member 140. The contact member 140 can contact the transmission output shaft 110, similar to the sealing member 150, inhibiting introduction of particulate contaminant into the cavity 134 under the support member 130, and further reducing the likelihood of upstream contamination of cavity 122.

The support member 130 can be composed of a variety of materials, but is typically made of an elastomer, such as a rubber, including a carbon-filled rubber material. Other materials can also be used, such as the fluoroelastomers previously described. In some embodiments, the support member 130 can be composed of a resilient material, while others can have stiffer compositions. Preferably, the support member 130 couples to the housing 120 in any appropriate way, including those coupling the sealing member 150 to the housing 120. Similarly, the contact member 140 can be coupled to the support member 130 as desired and/or appropriate for a particular embodiment.

The contact member 140 can be a washer or other annular member contacting the transmission output shaft 110. Preferably, the contact member 140 is wear-resistant and composed of an elastomer, such as a rubber. Some embodiments of contact members can be composed of a nitrile butadiene rubber (NBR), such as a carbon- or mineral-filled NBR. In certain embodiments, the contact member 140 can have resilient material properties, but it is not necessary for all embodiments. The contact member 140 preferably is coupled to the support member 130 with an appropriate technique, such as with an interference fit, bonding, fastening, and so on.

Both the support member 130 and contact member 140 can comprise a respective electrically-conductive surface 132, 142 which electrically couples the transmission output shaft to the housing 120. Each surface 132, 142 can have characteristics similar to those described with respect to the electrically-conductive surface 152. Preferably, the electrically-conductive surface 142 of the contact member 140 maintains contact—and thus, electrical conductivity—with the transmission output shaft 110 at all times. In this way, the electrically-conductive surface 142 of the contact member 140 can conduct RF and electrical energy from the transmission output shaft 110 to the electrically-conductive surface 132 of the support member 130. The electrically-conductive surface 132 of the support member 130, being electrically-coupled to the housing 120, thereby electrically connects the surface of the transmission output shaft 110 to the housing 120. As shown in FIGS. 1 and 2, the support member 130 can have an inner surface 136 disposed toward the transmission output shaft 110 and an outer surface 138 disposed outward or away from the transmission output shaft 110. Preferably, the electrically-conductive surface 132 is formed on the outer surface 138. Similarly, the electrically-conductive surface 142 is preferably formed on an outer surface 144 of the contact member 140. In certain embodiments, electrically-conductive surfaces can be formed on respective inner surfaces 146, 136 of the contact member 140 and support member 130 as well.

Figure 4:
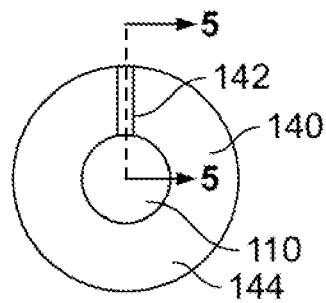
FIG. 4 is another cross-sectional view of the embodiment of FIG. 2.
Figure 5:
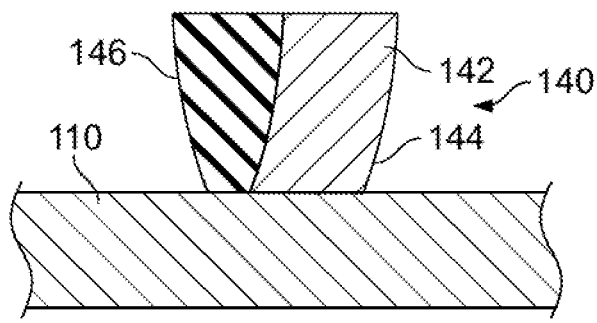
FIG. 5 is a detailed cross-sectional view of a portion of the embodiment as illustrated in FIG. 4.

With additional reference to FIG. 4, a front view of a cross section of the assembly 100 is shown. Similar to the sealing member 150, the contact member 140 can have its electrical surface 142 embodied as a strip extending through the contact member 140. FIG. 5 illustrates a cross-sectional view along the line 5-5, which shows that the electrically-conductive surface 142 can be embodied as an inset, occupying a portion of the thickness of the contact member 140 that would normally be occupied by material comprising the contact member 140. The insert can be embedded in the contact member 140 to any desired depth, including replacing a complete portion of the cross-section of the contact member 140, as described above with respect to the electrically-conductive surface 152 of the sealing member 150. Thus, although the contact member 140 is shown, a similar view can be made for some embodiments of the sealing member 150.

Thus, an electrical path exists between the transmission output shaft 110 and the housing 120 through the assembly 100. The electrical path can extend through either the surface 152 of the sealing member 150 or the surfaces 132, 142 of the support member 130 and contact member 140, respectively. Accordingly, RF energy and other electrical energy can be directed from the transmission output shaft 110 to the housing 120, which is an electrical ground. This prevents the RF energy from travelling throughout the drivetrain of the vehicle and interfering with radiofrequency devices.

Certain embodiments can have some or all of the features described. For example, some embodiments can omit the electrically-conductive surface 152 on the sealing member 150, while retaining the surfaces 132, 142 of the support member 130 and contact member 140, respectively. In other embodiments, the reverse can be true. The different variations of embodiments of surfaces—insert, coating, wedge, etc.—can be interchangeably combined as well. Thus, the surface 152 of the sealing member 152 can be a surface coating while the surfaces 132, 142 of the support member 130 and contact member 140 can be inserts, and so on.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A seal for a vehicle having a transmission output shaft and a transmission output shaft housing, the seal comprising:
    a poorly-conductive contact member at least partially surrounding and contacting the transmission output shaft;
    a poorly-conductive support member coupled to the poorly-conductive contact member, the poorly-conductive support member at least partially surrounding the transmission output shaft and extending along the transmission output shaft, the poorly-conductive support member coupled to the transmission output shaft housing;
    a first electrically-conductive surface overlying at least a portion of the poorly-conductive contact member and at least a portion of the poorly-conductive support member, the first electrically-conductive surface contacting the transmission output shaft and the transmission output shaft housing;
    a poorly-conductive sealing member physically coupled to the transmission output shaft housing and surrounding the transmission output shaft; and
    a second electrically-conductive surface overlying the poorly-conductive sealing member electrically coupling the transmission output shaft to the transmission output shaft housing.

2. The seal of claim 1, wherein the electrically-conductive surface comprises a metal powder coating.

3. The seal of claim 2, wherein the electrically-conductive surface comprises a nano-powder.

4. The seal of claim 1, wherein the electrically-conductive surface comprises zinc.

5. The seal of claim 1, wherein the electrically-conductive surface comprises copper.

6. The seal of claim 1, wherein the electrically-conductive surface comprises an adhesion layer between the support member and the electrically-conductive surface, and between the contact member and the electrically-conductive surface.

7. The seal of claim 1, further comprising an electrically-conductive insert embedded in the contact member and the support member, and contacting the transmission output shaft and the transmission output shaft housing.

8. The seal of claim 1, wherein the support member has an outer surface directed away from the transmission output shaft and the electrically-conductive surface is disposed on the outer surface.

9. The seal of claim 1, wherein the contact member comprises an elastomeric annular seal.

10. A seal for a vehicle having an electrically-conductive transmission output shaft and an electrically-conductive transmission output shaft housing, the seal comprising:
    a poorly-conductive sealing member adapted to establish contact with and at least partially surround the transmission output shaft, the sealing member adapted to inhibit entry of contaminants into the transmission output shaft housing;
    a first electrically-conductive surface overlying the poorly-conductive sealing member, the first electrically-conductive surface adapted to contact the transmission output shaft and the transmission output shaft housing;
    a poorly-conductive contact member having a substantially circular annular shape, the contact member adapted to contact the transmission output shaft;
    a poorly-conductive support member coupled to the poorly-conductive contact member, the poorly-conductive support member adapted to couple to the transmission output shaft housing; and
    a second electrically-conductive surface overlying the contact member and the support member, the second electrically-conductive surface adapted to contact the transmission output shaft and the transmission output shaft housing.

11. The seal of claim 10, wherein the sealing member has a substantially circular annular shape and the first electrically-conductive surface extends entirely around the sealing member.

12. The seal of claim 10, wherein the first electrically-conductive surface comprises an insert disposed in the sealing member.

13. The seal of claim 12, the sealing member has a thickness and the insert extends substantially through the thickness of the sealing member.

14. The seal of claim 10, wherein the first electrically-conductive surface comprises an ablative material.

15. A vehicle sealing assembly comprising:
    a transmission output shaft extending along a longitudinal axis;
    a transmission output shaft housing surrounding the transmission output shaft;
    a poorly-conductive sealing member physically coupled to the transmission output shaft housing and surrounding the transmission output shaft;
    a first electrically-conductive surface overlying the poorly-conductive sealing member electrically coupling the transmission output shaft to the transmission output shaft housing;
    a poorly-conductive support member physically coupled to the transmission output shaft housing and extending in the direction of the longitudinal axis;
    a second electrically-conductive surface overlaying the poorly-conductive support member electrically coupled to the transmission output shaft housing;
    a poorly-conductive contact member physically coupled to the support member; and
    a third electrically-conductive surface overlaying the poorly-conductive contact member, the third electrically-conductive surface electrically coupled to the transmission output shaft through the second electrically-conductive surface.

16. The vehicle sealing assembly of claim 15, wherein the sealing member comprises a fluoroelastomer.

17. The vehicle sealing assembly of claim 15, wherein the third electrically-conductive surface comprises a strip of an electrically-conductive material disposed on a first surface of the contact member.

18. The vehicle sealing assembly of claim 17, wherein the contact member comprises an annular member, the annular member having a second surface and surrounding the transmission output shaft, and the strip extends in a radial direction along the annular member.

19. The vehicle sealing assembly of claim 15, wherein the support member has an inner surface disposed toward the transmission output shaft and an outer surface disposed away from the transmission output shaft, and the second electrically-conductive comprises an electrically-conductive surface on the outer surface.

* * * * *